United States Patent
Birk et al.

(10) Patent No.: US 6,250,144 B1
(45) Date of Patent: Jun. 26, 2001

(54) METHOD AND DEVICE FOR CORRECTING TOLERANCES IN A TRANSMITTER WHEEL

(75) Inventors: Manfred Birk, Oberriexingen; Dirk Samuelsen, Asperg; Peter Rupp, Remseck; Rüdiger Fehrmann, Leonberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,828

(22) PCT Filed: Mar. 21, 1998

(86) PCT No.: PCT/DE98/00839

§ 371 Date: Apr. 1, 1999

§ 102(e) Date: Apr. 1, 1999

(87) PCT Pub. No.: WO99/08071

PCT Pub. Date: Feb. 18, 1999

(30) Foreign Application Priority Data

Aug. 6, 1997 (DE) .............................. 197 33 958

(51) Int. Cl.[7] .................................. G01M 15/00
(52) U.S. Cl. ........................................... 73/116
(58) Field of Search .................... 73/116, 117.2, 73/117.3; 340/438, 441; 701/101, 102, 110, 111

(56) References Cited

U.S. PATENT DOCUMENTS

| | | | |
|---|---|---|---|
| 5,117,681 | * | 6/1992 | Dosdall et al. .................... 73/116 |
| 5,428,991 | * | 7/1995 | Klenk et al. ....................... 73/116 |
| 5,481,909 | * | 1/1996 | Deutsch et al. .................. 73/117.3 |
| 5,531,108 | * | 7/1996 | Feldkamp et al. ............... 73/117.3 |
| 5,622,154 | * | 4/1997 | Wrobel ............................. 73/117.3 |
| 5,696,316 | * | 12/1997 | Mezger et al. .................... 73/116 |
| 5,789,658 | * | 8/1998 | Henn et al. ........................ 73/116 |
| 5,864,775 | * | 1/1999 | Bradshaw et al. ............... 73/117.3 |
| 6,062,071 | * | 5/2000 | Henn et al. ...................... 73/117.3 |

FOREIGN PATENT DOCUMENTS

| | | |
|---|---|---|
| 41 33 679 | 4/1993 | (DE) . |
| 195 27 218 | 6/1996 | (DE) . |
| 0 306 906 | 3/1989 | (EP) . |
| 0 655 554 | 5/1995 | (EP) . |
| 95 23974 | 9/1995 | (WO) . |

* cited by examiner

Primary Examiner—Eric S. McCall
(74) Attorney, Agent, or Firm—Kenyon & Kenyon

(57) ABSTRACT

A method and a device for correcting for tolerances in a transmitter wheel are described. The transmitter wheel has a plurality of approximately equidistant marks that are scanned by a pickup. The pickup supplies a pulse train on the basis of which measured values are formed, with correction values being determined on the basis of a comparison of the individual measured values with a reference value. The measured values are filtered with at least one first and one second frequency-selective filtering.

11 Claims, 3 Drawing Sheets

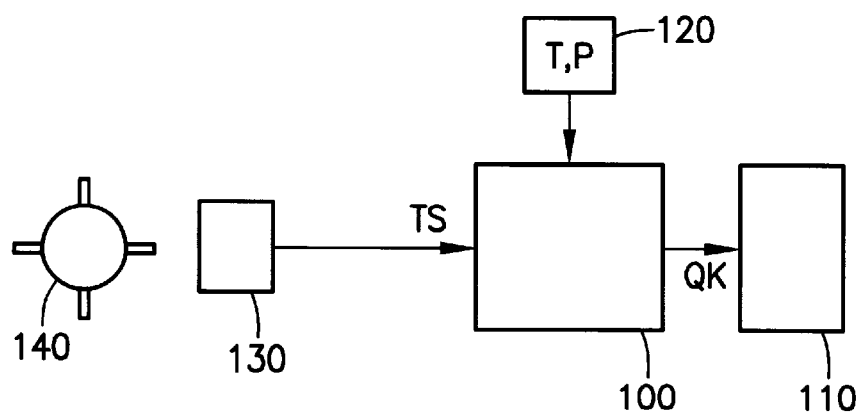
Fig. 1
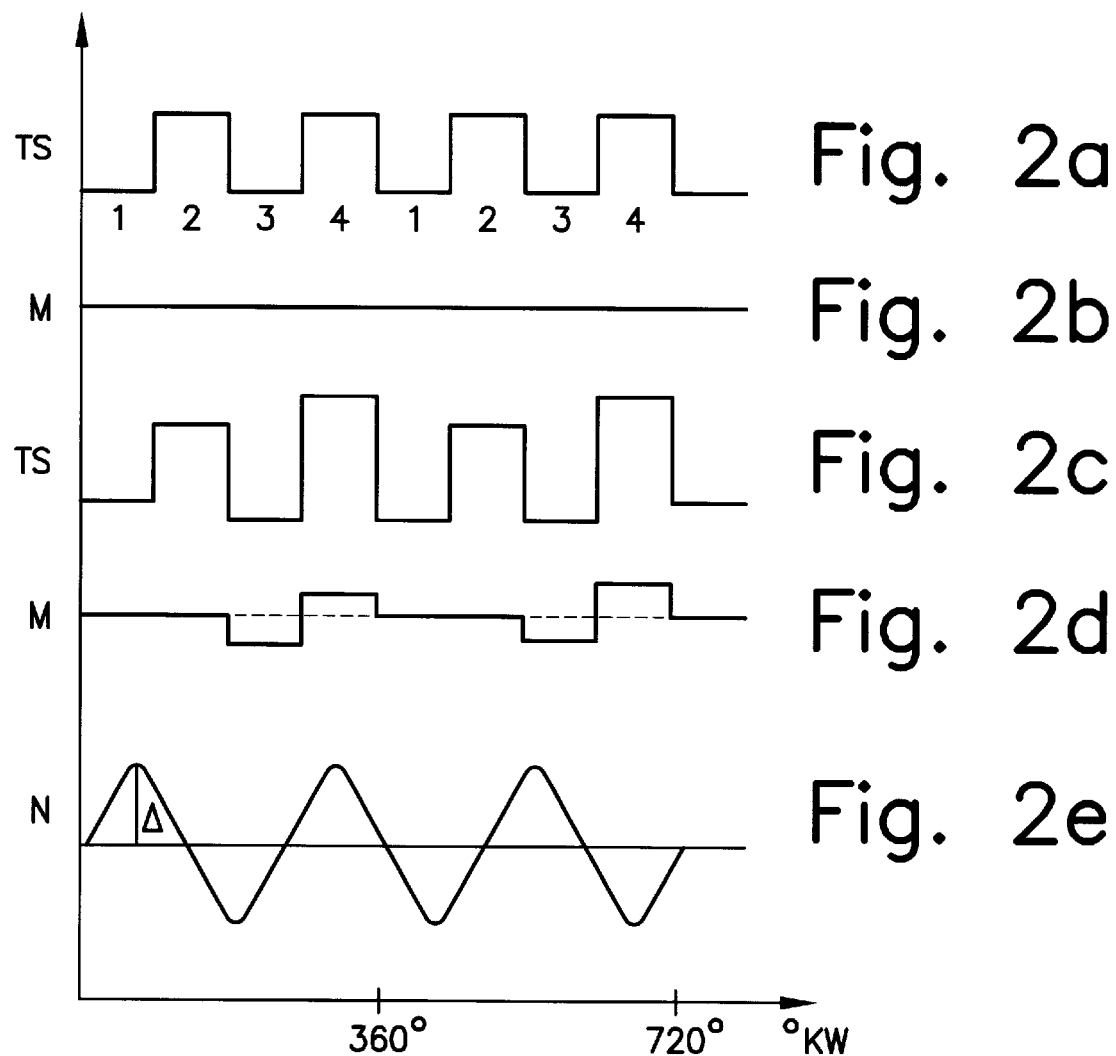
Fig. 2a
Fig. 2b
Fig. 2c
Fig. 2d
Fig. 2e

METHOD AND DEVICE FOR CORRECTING TOLERANCES IN A TRANSMITTER WHEEL

FIELD OF THE INVENTION

The present invention relates to a method and a device for adapting tolerances of a transmitter wheel.

BACKGROUND INFORMATION

A method and a device for adapting tolerances of a transmitter wheel is known from, for example, German Patent No. 41 33 679 (U.S. Pat. No. 5,428,991), which describes a method and a device for adapting mechanical tolerances of a transmitter wheel. The transmitter wheel has a plurality of approximately equidistant marks which are sensed by a pickup supplying a pulse train on the basis of which measured values are formed.

Because of tolerances in the manufacture and installation of the transmitter wheel, the markings are not always equidistant. Therefore, means are provided for these tolerances to be learned and taken into account. To do so, the individual measured values are compared with a reference value. A certain measured value is used as the reference value.

With this procedure, only tolerances assuming the same value in all operating states can be compensated. However, tolerances which have different values in different operating states usually also occur.

The manufacturing tolerances of the transmitter wheel have almost the same effect in all operating states. However, torsional vibration of the shaft on which the transmitter wheel is arranged depends on the operating state. As a result, these tolerances cannot be adequately compensated with the procedure according to the related art.

In addition, German Patent No. 195 27 218 describes a method and a device for controlling the smooth operation of an internal combustion engine. With this device, correction values for the quantity of fuel to be injected are determined on the basis of measured values of a segmented wheel to perform a cylinder equalization. This should achieve the result that the same quantity of fuel is metered to all cylinders. To do so, the speed signal is analyzed. Irregular speed suggests the occurrence of irregular injection, which is corrected accordingly.

Transmitter wheel tolerances result in uneven speeds of the individual segments, although the quantity of fuel injected is uniform. When the above method is used, the speed is regular but the quantity of injected fuel differs from one cylinder to the next.

SUMMARY OF THE INVENTION

An object of the present invention is to differentiate between the various causes for tolerances of a transmitter wheel in a method and with a device for adapting these tolerances by differentiating between tolerances that depend on the operating state and those that do not.

Different tolerances that depend on the operating state and those that are independent to the operating state can be corrected in all operating states with the procedure according to the present invention.

BRIEF DESCRIPTION OF THE DRAWINGS

FIG. 1 is a block diagram of a controller of an internal combustion engine according to one embodiment of the present invention.

FIG. 2a is a plot of the segment times of an ideal tolerance-free transmitter wheel.

FIG. 2b is a plot of the average segment time for a tolerance-free transmitter wheel.

FIG. 2c is a plot of the segment times of a transmitter wheel where the marks are not equidistant because of mechanical tolerances.

FIG. 2d is a plot of the average segment time for a transmitter wheel where the marks are not equidistant.

FIG. 2e is a plot of speed fluctuations attributed to torsional vibrations of a crankshaft.

DETAILED DESCRIPTION

Figure 3:
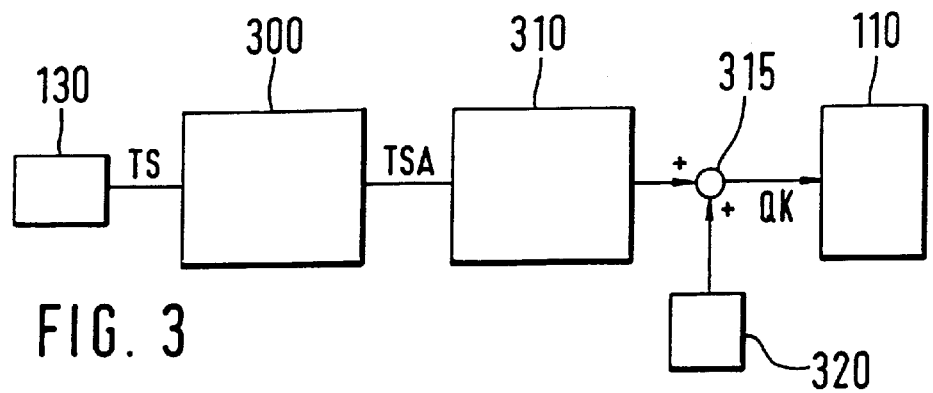
FIG. 3 is a block diagram of a controller according to one embodiment of the present invention.

Transmitter wheel adaptation is described below using the example of a controller of an internal combustion engine, in particular a four-cylinder diesel engine. However, the present invention is not limited to the number of cylinders or the type of internal combustion engine.

FIG. 1 is a block diagram, illustrating in rough schematic form a controller of an internal combustion engine. Actual controller 100 sends control signals to various actuators 110 to influence, for example, the quantity of fuel injected QK, which is metered to the internal combustion engine. Controller 100 processes various output signals from various sensors 120, which detect temperature values T, pressure values P, for example, as well as other operating characteristics.

Furthermore, controller 100 processes an output signal of pickup 130, which scans a transmitter wheel 140. wheel 140 has a number of approximately equidistant marks.

In the embodiment illustrated here, the transmitter wheel is arranged on the crankshaft and has four marks. However, transmitter wheel 140 may also be arranged on the camshaft of the internal combustion engine.

The distance between two marks is called a segment and its period is segment time TS. If four marks are provided on the crankshaft, this means that the distance between two injections is divided into two segments. Such a transmitter wheel is usually called a segmented wheel.

Transmitter wheel 140 may also be designed as an incrementing wheel. In this case, a plurality of marks are provided. The number of marks is greater than the number of cylinders in the internal combustion engine. The marks usually have a gap, i.e., one mark is missing. Transmitter wheels with 60-2 marks are often used.

Pickup 130 scans the marks and preferably supplies a signal TS as a measured value corresponding to the segment time.

FIGS. 1a–e shows various signals plotted over time. FIG. 2a shows segment times TS of an ideal tolerance-free transmitter wheel. Since there is essentially one segment before the injection and one segment after the injection, the segment times alternately assume different values.

In FIG. 2b, average M is plotted over all the segment times. The average is preferably formed over multiple segments, i.e., measured values are formed. The values are preferably averaged over one working cycle, i.e., over the crankshaft angle range of 720 degrees. With an ideal transmitter wheel without tolerances, the individual segment times do not deviate from the average.

FIG. 2c shows the segment times of a transmitter wheel, where the marks are not exactly equidistant because of mechanical tolerances. In the example illustrated here, this leads to the segment time of segment 3 being too short and the segment time of segment 4 being greater than the normal value.

FIG. 2d again depicts average M for an ideal tolerance-free transmitter wheel with a continuous dotted line and the deviation in the individual segment times from the average with a continuous line. It is found that the segment time deviates from the average at segment 3 and segment 4. Deviations of this type lead to fluctuations in the speed signal with an integral multiple of the crankshaft frequency.

FIG. 2e shows an example of a plot of speed fluctuations which are attributed to torsional vibrations of the crankshaft. It has been found according to the present invention that these vibrations occur with a frequency amounting to a half-integral multiple of the frequency of the crankshaft.

It is proposed here that tolerances of transmitter wheel 140 which lead to speed fluctuations can be compensated by adaptation. The device shown in FIG. 3 is used for this purpose. Blocks already depicted in FIG. 1 are labeled with the same reference numbers here.

Output signal TS of pickup 130 is transmitted to adaptation unit 300 which corrects these values and relays them as quantity TSA. Corrected segment times TSA are processed by balance controller 310 in the embodiment illustrated here. Such a balance controller 310 is known from Unexamined German Patent No. 195 27 218, for example. The output signal of balance controller 310 is preferably linked to the output signal of a quantity controller 320 at a gate 315. Quantity signal QK thus formed is sent then to actuator 110. Quantity signal QK may be, for example, the control time of a solenoid valve.

Pickup 130 scans the marks on transmitter wheel 140. The signals generated by pickup 130 can be processed by filtering out interfering pulses, for example. If transmitter wheel 140 is designed as an incrementing wheel and if it has a plurality of marks, Pickup 130 forms measured values corresponding to the output signal [s] of a segmented wheel 140 on the basis of this plurality of marks. The output signals of pickup 130 are hereinafter referred to as measured values or as segment times TS.

The output signal of pickup 130 then is transmitted to adaptation unit 300, where the tolerances due to mechanical tolerances in the spacing of the markings and in the torsional vibrations are compensated by correction factors.

Segment times TSA corrected in this way are then processed further. For example, these corrected segment times TSA may be processed by balance controller 310. Instead of balance controller 310, however, other function blocks may also be provided to process a speed signal. Thus, for example, the segment times may also be sent to a misfiring detector.

Figure 4:
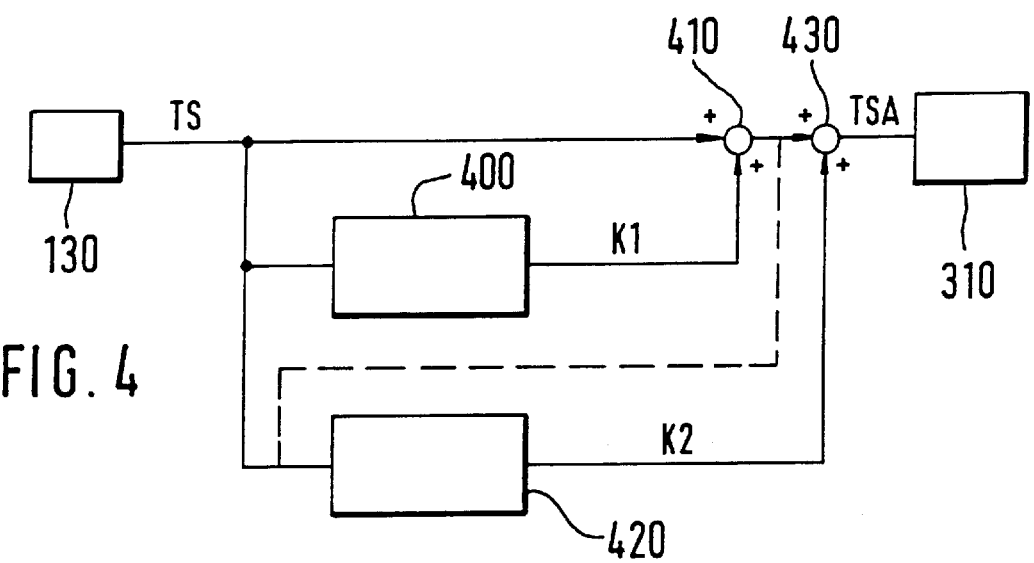
FIG. 4 is a block diagram of an adaptation block according to one embodiment of the present invention.

FIG. 4 shows adaptation unit 300 in greater detail. Output signal TS of pickup 130 goes to a first adaptation block 400, which sends a first correction value K1 to gate 410. In addition, output signal TS of pickup 130 goes to second adaptation block 420 which sends a second correction value K2 to a gate 430. In addition, output signal TS of pickup 130 goes directly to the second input of gate 410.

Gate 410 links signal TS and first correction value K1, preferably by addition. The output signal of gate 410 goes to the first input of gate 430, which links this signal to second correction value K2, preferably by addition. Corrected segment time TSA is produced at the output of gate 430 and is then processed further by balance controller 310, for example.

First adaptation block 400 determines a first correction value K1 which compensates for mechanical defects in transmitter wheel 140, for example. To differentiate between tolerances based on transmitter wheel defects and those due to other causes such as torsional vibration, the output signal of pickup 130 is filtered.

A first filter is designed to select vibrations having the crankshaft frequency or integral multiples of the crankshaft frequency and to make them available for adaptation. The first filter subjects the measured values to a first frequency-selective filtering. Starting from this filtered signal, which corresponds approximately to the signal illustrated in FIG. 2c, the deviations in the individual segment times from average M are determined and stored as a first correction value for the individual segments. This first correction value K1, which takes into account the deviation in the individual segment times from the average due to transmitter wheel defects, is then added to output signal TS of pickup 130. The signal thus formed then corresponds to the curve in FIG. 2a if there were no torsional vibrations.

In second adaptation block 420, second correction value K2 is determined, compensating for deviations in signal TS from the average due to torsional vibrations. To do so, the measured values of pickup 130 are subjected to a second frequency-selective filtering. The second filtering is designed so that it selects vibrations with half-integral multiples of the crankshaft frequency. Starting with the resulting filtered signal, correction value K2 is then determined. This second correction value K2 is then added to the measured value for the individual segment times in gate 430.

Figure 5:
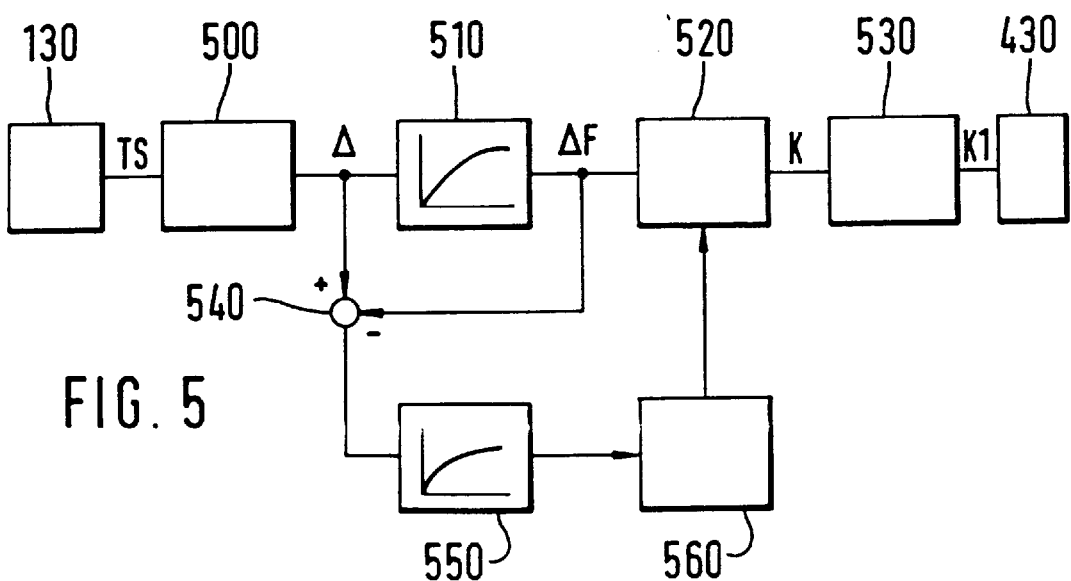
FIG. 5 is a detailed diagram of an adaptation block according to one embodiment of the present invention.

FIG. 5 shows second adaptation block 420 in greater detail. Output signal TS of pickup 130 goes to filter and reference model 500. Its output signal Δ is passed through first low-pass filter 510 producing filtered signal ΔF which is passed to learning strategy unit 520 at whose output a basic correction value K appears. This basic correction value goes to a weighting unit 530 which calculates first correction value K1 from basic correction value K and a factor F that depends on the operating characteristics, characteristics. Weighing unit 530 passes correction value K1 to gate 430.

In addition, output signal ΔF of the first low-pass filter is subtracted from output signal a of filter and reference model 500 at gate 540. The output signal of gate 540 is passed to second low-pass filter 550, which acts on weighting unit 560. Weighting unit 560 influences learning strategy unit 520.

First adaptation block 400 and second adaptation block 420 differ essentially only in filter and reference model 500 and weighting unit 530. Filters that select different frequencies are used in filter and reference model 500. Weighting unit 530 utilizes a constant factor in first adaptation block 400. Weighting is performed according to the operating characteristics in second adaptation block 420.

An especially advantageous embodiment of the procedure according to the present invention is indicated with dotted lines in FIG. 4. In this embodiment, instead of sending output signal TS of pickup 130 to second adaptation block 420, which corrects for the torsional vibrations, the output signal of gate 410 is sent. This means that the tolerances in transmitter wheel 140 are corrected first. The signal corrected in this way is then used in second adaptation block 420 to determine correction value K2 for compensation of the torsional vibrations.

Figure 6A:
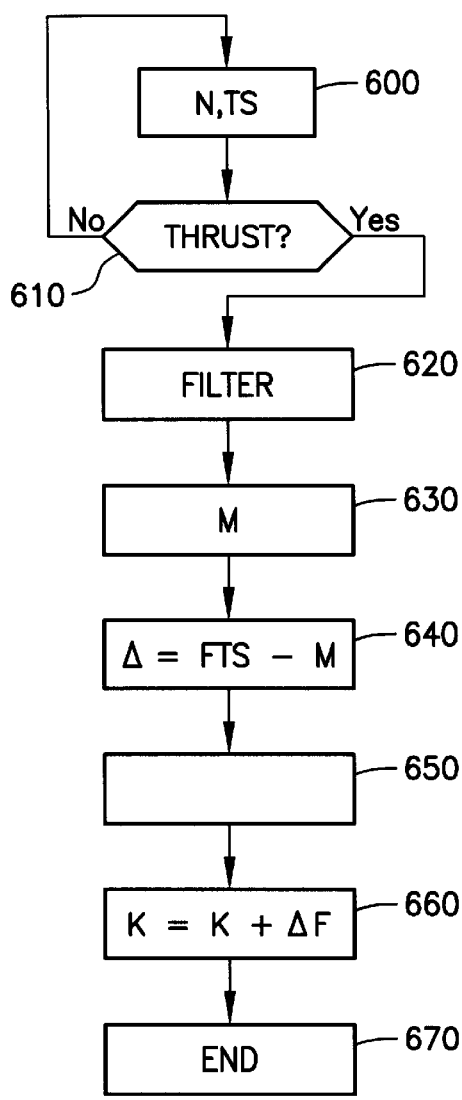
FIG. 6a is a flow chart illustrating the function of an adaptation block according to one embodiment of the present invention.

The operation of second adaptation block 420 is described below on the basis of the flow charts in FIG. 6. In step 600, measured values are determined by measuring pickup 130. Query 610 checks whether there is a preferred operating state where adaptation is possible and/or relevant.

Thrust operation is preferably selected as the preferred operating state. However, other operating states where adaptation is performed may also be provided.

Frequency-selective filtering of the measured values takes place in step 620. In first adaptation block 400, the frequency components constituting integral multiples of the crankshaft frequency are filtered out by a first frequency-selective filter. With this filter, the frequency components that are due essentially to effects of manufacturing tolerances and essentially do not depend on the operating state are filtered out.

The frequency components constituting half-integral multiples of the crankshaft frequency are filtered out in second adaptation block 420. Those frequency components that are basically due to the influence of torsional vibrations and are basically dependent on the operating state are filtered out at this point.

The various influences on the measured values of pickup 130 are selected by frequency-selective filtering. Then correction values for correcting for the various influences are determined in the respective adaptation block 400 or 420.

If the transmitter wheel 140 is arranged on another shaft, the frequencies are based on the frequency of the shaft on which the transmitter wheel is arranged.

A reference value is calculated in step 630. An average of several measured values is preferably used as the reference value. In the embodiment here, the values are preferably averaged over four segments i.e., over 360 degrees of crankshaft angle or over a complete working cycle, i.e., 720 degrees of crankshaft angle.

In step 640, error value $\Delta$, i.e., the difference between filtered measured value FTS and reference value M, is formed. This value is shown in FIG. 2e. This value is a measure of the error due to the torsional vibrations or to other effects, which lead to similar errors.

In step 650, the learning progress is evaluated in weighting unit 560. To do so, output signal $\Delta F$ of first low-pass filter 510 is compared with input signal $\Delta$ of first low-pass filter 510 and filtered in second low-pass filter 550, and learning strategy unit 520 is influenced on the basis of this signal. This measure should prevent short-term interference in measured values from causing a change in correction value K or K1. This means that short-term changes in measured values detected by low-pass filtering are not taken into account. This weighting and learning strategy correspond essentially to the procedure described in the related art.

Then in step 660, basic correction value K is determined on the basis of value $\Delta F$. In the simplest embodiment, newly determined error value $\Delta F$ is added to the stored basic correction value. In especially advantageous embodiments, it may also be possible for correction value K to be formed on the basis of the average over several error values $\Delta F$.

Figure 6B:
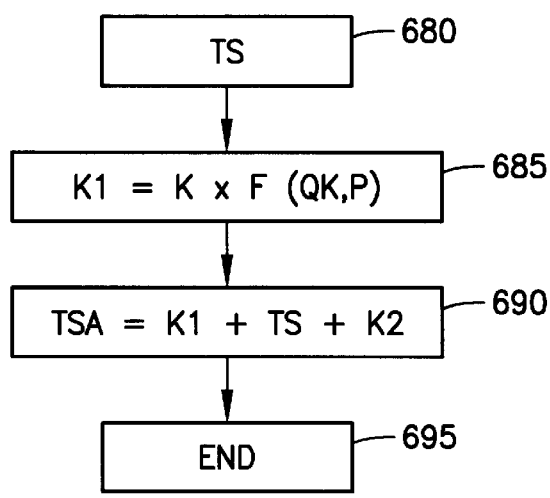
FIG. 6b is a flow chart illustrating how stored correction values are used for correction of measured values according to one embodiment of the present invention.

In step 670, determination of the basic correction value, which is preferably performed in the preferred operating states, is ended. In normal operation, i.e., inside and outside these preferred operating states, the stored correction values are used for correction of measured values TS. This is shown in FIG. 6b. In step 680, measured values TS are detected by pickup 130, optionally filtered and relayed. In step 685, first correction value K1 is calculated in weighting unit 530. To do so, basic correction value K is multiplied by a factor F which can in turn be predetermined, depending on various operating states.

It is especially advantageous if factor F can be predetermined as a function of fuel quantity QK to be injected or a signal characterizing the quantity of fuel to be injected, such as the injection time or a signal determining the performance of the internal combustion engine. In addition, it is advantageous if additional operating characteristics such as boost pressure P or other parameters are also taken into account.

In step 690, corrected measured value TSA is determined on the basis of first correction value K1, second correction value K2 and measured value TS. To do so, the three quantities are preferably added. Then the program ends at step 695.

The correction described here is performed for all segment times. In the embodiment of a four-cylinder internal combustion engine with four marks as presented here, the correction values for segments 1 through 4 are determined. According to the present invention, a basic correction value is determined in thrust operation and then used in all other operating states, with the correction values for the individual operating states being determined on the basis of the basic correction value and a factor which depends on the operating characteristic.

It is assumed here that no fuel is injected in thrust operation, so all vibrations can be attributed to tolerances due to transmitter wheel defects, torsional vibrations and other effects. There are no effects that can be attributed to the quantities of fuel injected and could have a negative effect on the measurement. The adaptation can also be performed in principle even if fuel is injected.

With the procedure according to the present invention, the various influences on the speed signal, which are attributed to various causes, are separated from one another and can be corrected individually due to the frequency-selective filtering of the measured values. This is especially advantageous, because errors based on the arrangement of marks do not depend on operating state, and errors based on torsional vibrations do depend on operating state, and thus can be corrected as a function of operating characteristics.

What is claimed is:

1. A method for correcting tolerances in a transmitter wheel having a plurality of approximately equidistant marks, comprising the steps of:

generating a pulse train signal by scanning the marks with a pickup;

generating individual measured values from the pulse train signal;

performing at least one first frequency-selective filtering of the individual measured values and at least one second frequency-selective filtering of the individual measured values;

filtering the individual measured values to select first frequency components, the first frequency components being caused by tolerances independent of an operating state of an internal combustion engine;

filtering the individual measured values to select second frequency components, the second frequency components being caused by tolerances dependent on the operating state of the internal combustion engine; and determining correction values by comparing the individual measured values with a reference value.

2. The method according to claim 1, wherein the reference value is generated from an average of a plurality of the measured values.

3. The method according to claim 1, further comprising at least one of the steps of:

filtering the individual measured values to select frequency components with integral multiples of a frequency of a shaft on which the transmitter wheel is mounted; and filtering the individual measured values to select frequency components with half-integral multiples of the frequency of the shaft on which the transmitter wheel is mounted.

4. The method according to claim 1, wherein the correction values are generated in preferred operating states of the internal combustion engine.

5. The method according to claim 4, wherein the preferred operating states of the internal combustion engine include a thrust operation state of the internal combustion engine.

6. The method according to claim 4, wherein the step of determining the correction values further includes the step of generating a basic correction value in the preferred operating states of the internal combustion engine.

7. The method according to claim 6, wherein the correction values are determined as a function of the basic correction value and a factor, the factor being dependent on at least one operating characteristic of the internal combustion engine.

8. The method according to claim 7, wherein the factor is predetermined at least as a function of a parameter characterizing a quantity of fuel to be injected.

9. The method according to claim 1, wherein:

the tolerances independent of the operating state are mechanical tolerances; and the tolerances dependent on the operating state are tolerances caused by torsional vibrations.

10. A device for correcting tolerances in a transmitter wheel having a plurality of approximately equidistant marks, comprising:

a pickup scanning the marks and providing a pulse train from which individual measured values are formed;

a correction device for determining correction values as a function of a comparison of the individual measured values with a reference value; and a filter arrangement, the filter arrangement first frequency-selective filtering and second frequency-selective filtering the individual measured values, the filter arrangement filtering the individual measured values to select first frequency components and second frequency components, the first frequency components being caused by tolerances independent of an operating state of an internal combustion engine, the second frequency components being caused by tolerances dependent on the operating state of the internal combustion engine.

11. The device according to claim 10, wherein:

the tolerances independent of the operating state are mechanical tolerances; and the tolerances dependent on the operating state are tolerances caused by torsional vibrations.

* * * * *